(12) United States Patent
Guering et al.

(10) Patent No.: US 11,548,618 B2
(45) Date of Patent: Jan. 10, 2023

(54) RUDDER BAR FOR AIRCRAFT WITH A ONE-PIECE AND DETACHABLE MAIN MODULE

(71) Applicant: Airbus Operations SAS, Toulouse (FR)

(72) Inventors: Bernard Guering, Montrabe (FR); Matthieu De Kergommeaux, Toulouse (FR)

(73) Assignee: Airbus Operations SAS

( * ) Notice: Subject to any disclaimer, the term of this patent is extended or adjusted under 35 U.S.C. 154(b) by 699 days.

(21) Appl. No.: 16/411,361

(22) Filed: May 14, 2019

(65) Prior Publication Data
US 2019/0359319 A1    Nov. 28, 2019

(30) Foreign Application Priority Data

May 22, 2018   (FR) ..................................... 1854222

(51) Int. Cl.
| | | |
|---|---|---|
| *B64C 13/04* | (2006.01) | |
| *B64C 13/50* | (2006.01) | |
| *B64C 13/06* | (2006.01) | |

(52) U.S. Cl.
CPC ............ *B64C 13/044* (2018.01); *B64C 13/06* (2013.01); *B64C 13/507* (2018.01)

(58) Field of Classification Search
CPC ....... B64C 13/06; B64C 13/12; B64C 13/507; B64C 13/14; B64C 13/04
See application file for complete search history.

(56) References Cited

U.S. PATENT DOCUMENTS

| | | | | |
|---|---|---|---|---|
| 9,581,226 | B2 * | 2/2017 | Petrou ................... | B64C 13/044 |
| 10,017,242 | B2 * | 7/2018 | Huynh .................. | B64C 13/044 |
| 10,293,802 | B2 * | 5/2019 | Koga ..................... | F16D 65/78 |
| 2014/0131523 | A1 * | 5/2014 | Carner ................... | B64C 13/12 |
| | | | | 244/235 |
| 2016/0348772 | A1 * | 12/2016 | Petrou .................. | B64C 13/044 |
| 2017/0113784 | A1 * | 4/2017 | Guering ................ | B64C 13/341 |
| 2017/0166296 | A1 * | 6/2017 | Guering ................ | B64C 13/044 |
| 2017/0174324 | A1 * | 6/2017 | Carner ................... | B64C 13/12 |
| 2017/0217567 | A1 * | 8/2017 | Huynh .................. | B64C 13/14 |
| 2017/0369154 | A1 * | 12/2017 | Zimmer ................. | B64C 13/06 |
| 2019/0359318 | A1 * | 11/2019 | Guering ................ | B64C 13/06 |
| 2019/0359320 | A1 * | 11/2019 | Guering ............... | B64C 13/044 |
| 2020/0055588 | A1 * | 2/2020 | Ezran ..................... | B64C 13/46 |

FOREIGN PATENT DOCUMENTS

| | | | | |
|---|---|---|---|---|
| WO | 2016191071 | A1 | 12/2016 | |
| WO | WO 2016/191071 | | * 12/2016 | ............. B64C 13/06 |

OTHER PUBLICATIONS

Mk Recirculating Ball Bearing Guides [online]. mk Technology Group. Retrieved via the Internet Archive Mar. 12, 2018: <URL: https://web.archive.org/web/20180312021330/http://www.mk-group.com/en/products/conveyor-technology/linear-technology/recirculating-ball-bearing.html> (Year: 2018).*

* cited by examiner

*Primary Examiner* — Richard R. Green
(74) *Attorney, Agent, or Firm* — Lerner, David, Littenberg, Krumholz & Mentlik, LLP (57) ABSTRACT

A rudder bar includes a main module provided at least with pedals and with all the elements subject to maintenance, the main module being one-piece and detachable relative to a support frame integrated into the floor of the cockpit of the aircraft, so as to exhibit significant flexibility with respect to its maintainability, particularly in the event of the failure of a component, by allowing quick intervention both on a local level and an overall level.

11 Claims, 5 Drawing Sheets

RUDDER BAR FOR AIRCRAFT WITH A ONE-PIECE AND DETACHABLE MAIN MODULE

FIELD OF THE INVENTION

The present invention relates to a rudder bar for an aircraft, in particular for a transport airplane, as well as to an aircraft comprising such a rudder bar.

BACKGROUND OF THE INVENTION

On an aircraft, a rudder bar is a mechanical device that allows the pilot and co-pilot to control the rudder and the wheel brakes.

The rudder bar comprises pedals and a set of movable parts, which, depending on the types of movements that are applied to the pedals by the one or more pilots, control the rudder or the brakes of the aircraft.

The rudder bars used on aircraft are, mainly on airliners, rudder bars that are integrated into the floor of the cockpit.

In order to be operated, the rudder bar must comprise a large number of parts (hinges, connecting rods, pivots, etc.) Such a conventional rudder bar is complex, particularly due to this high number of parts.

It is generally not conceivable, due to its size and its architecture, for a rudder bar to be disassembled (except in extreme circumstances).

With a conventional rudder bar that is not easily disassembled, it is necessary, in the event of an intervention, for significant volumes to be cleared that are simply required for maintenance. Furthermore, such disassembly, which is possible in a conventional nose cone of an aircraft, becomes impossible in a new generation nose cone, in which the volumes dedicated to these functions are intentionally condensed in order for gains to be achieved by increasing the payload volumes.

A conventional rudder bar therefore does not exhibit significant flexibility with respect to its maintainability, in the event of a failure of one or more of its internal components.

BRIEF SUMMARY OF THE INVENTION

Aspects of the present invention may provide a rudder bar that allows this disadvantage to be overcome. It relates to a rudder bar for an aircraft, said rudder bar comprising at least pedals and a set of functionalities.

According to an embodiment of the invention, said rudder bar comprises a main module provided at least with said pedals and with said set of functionalities, said main module being one-piece and detachable.

Within the scope of the present description, "one-piece module" is understood to be a module that is a single or unitary block (i.e. that corresponds to a single object).

Thus, by virtue of the integration of the main elements into a single main module that is detachable, the rudder bar exhibits significant flexibility, in terms of its maintainability, particularly in the event of the failure of one or more of its internal components. This allows the aforementioned disadvantage to be overcome.

In a preferred embodiment, said main module comprises, in order to integrate all the functionalities, a central module comprising a base module and an electronic module, the electronic module being detachably mounted on the base module.

Advantageously, in a mounted position, the electronic module is rigidly connected to the base module via front centering elements and rear attachment elements.

Furthermore, advantageously:
the base module is provided with at least one access hatch; and/or
the electronic module is provided with at least one access hatch.

Moreover, in a preferred embodiment, the main module also comprises two pedal modules, each of said pedal modules being provided with a pedal, said pedal modules being detachably mounted on both sides of a base module, each of said pedal modules being mounted on an associated lateral face of the base module.

Advantageously, the base module is provided, on each of the lateral faces, with guide rails configured to engage with recirculating ball bearing packs, fixed on the associated pedal module.

Advantageously, the base module is provided with at least one access hatch on at least one of the lateral faces of said base module.

Furthermore, advantageously, the rudder bar comprises a pedal feel and compensation unit, of the PFTU (Pedal Feel and Trim Unit) type, that is integrated into the central module of the main module.

Advantageously, the pedal feel and compensation unit comprises at least some of the following elements: a clutch solenoid, a shaft clutch, a compensation motor, rudder bar shaft position sensors, compensation shaft position sensors, feel springs.

Furthermore, advantageously, the central module comprises at least one component that is mounted by means of a dedicated (quick) locking/unlocking system.

In a particular embodiment, said locking/unlocking system comprises:
a housing intended to receive the component, said housing being provided with a single access opening and a guide shaft arranged at an end opposite the access opening; and
a closure device mounted in an articulated manner and able to at least partially close said access opening and able to lock a component installed in the housing.

Furthermore, in a particular embodiment, the rudder bar further comprises at least one curved support frame intended to be integrated into a floor of the aircraft, and said main module is configured to be able to be moved and positioned on the curved support frame, using a movement unit.

Advantageously, the movement unit comprises a guide system provided with two guide rails mounted on the support frame and engaging with rollers rotationally mounted under the main module.

The present invention also relates to an aircraft, in particular a transport airplane, which is provided with a rudder bar as specified above.

BRIEF DESCRIPTION OF THE DRAWINGS

The accompanying figures will clearly show how the invention can be produced. In these figures, identical reference signs denote similar elements. More specifically.

DETAILED DESCRIPTION

Figure 1:
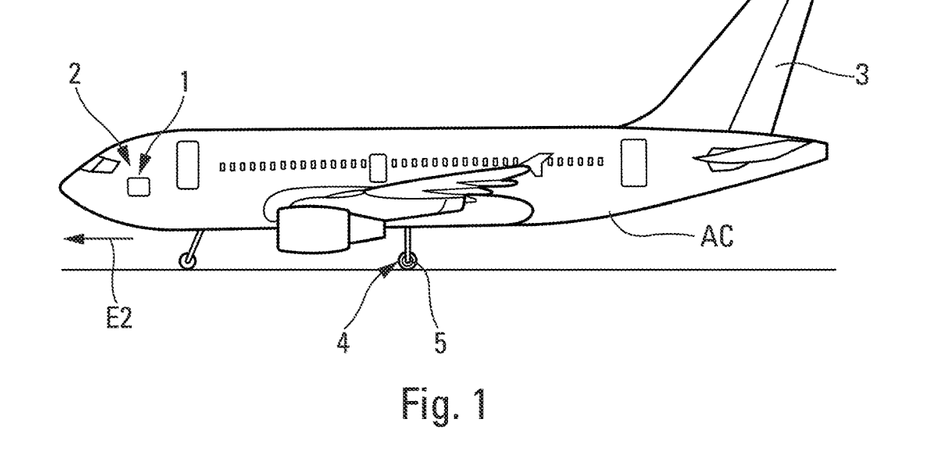
FIG. 1 shows a lateral view of an airplane on the ground that comprises a rudder bar according to one embodiment of the invention.

FIG. 1 shows an aircraft AC, in this case a transport airplane, that comprises a cockpit 2, in which a rudder bar 1 according to an embodiment of the invention is arranged (as is highly schematically shown in this FIG. 1). The aircraft AC also comprises a rudder 3 and brakes 4 on the wheels 5 of a main set of landing gear of the aircraft AC.

Figure 2:
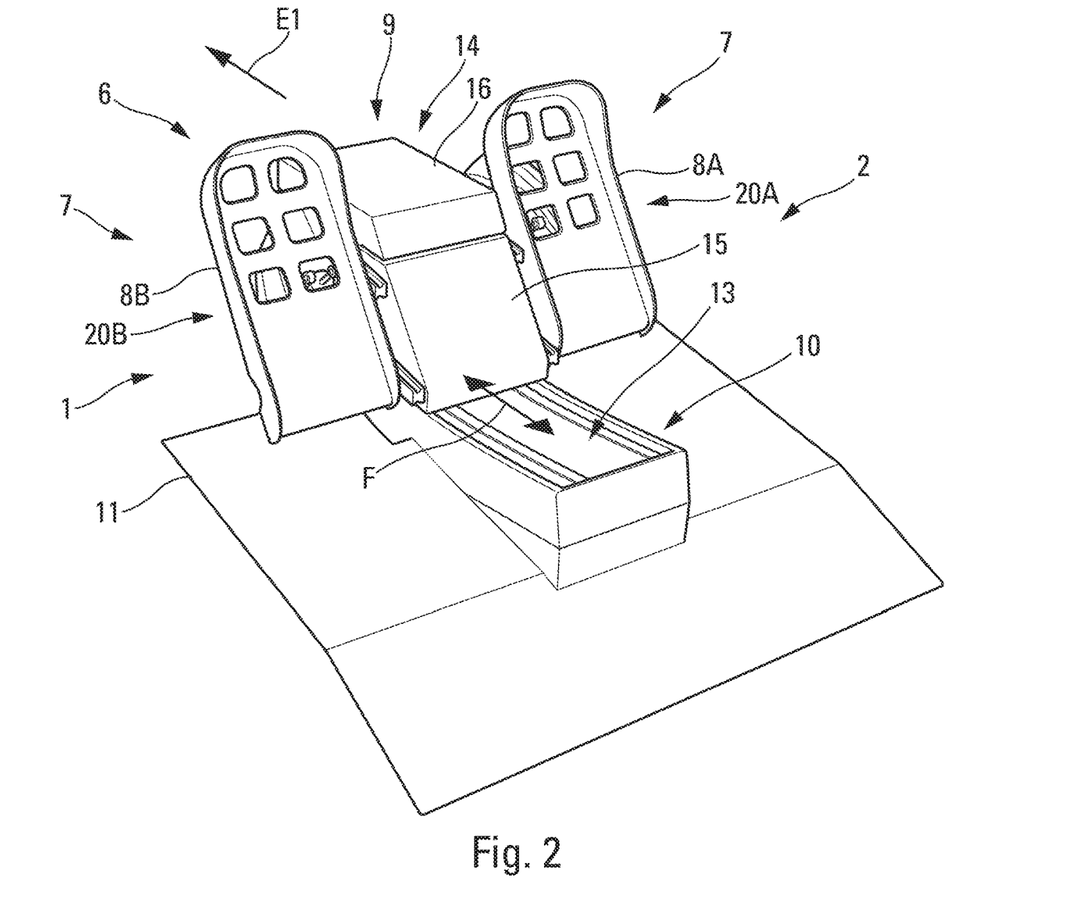
FIG. 2 is a perspective view of a rudder bar mounted on a support frame viewed from the rear.

FIG. 2 shows a rudder bar 1 that is intended to be arranged in the cockpit 2 of the aircraft AC, by being integrated into the floor 11 of the cockpit 2. Within the scope of the present description, the "rear" and "front" directions are defined relative to the longitudinal direction of the aircraft AC, namely, for "front" (as shown in FIGS. 2, 3 and 4 by an arrow E1), toward the front of the aircraft AC (in the direction of an arrow E2 in FIG. 1) in the direction of flight (or of movement) of the aircraft AC, and for "rear" (as shown in FIG. 3 by an arrow E3), toward the rear of the aircraft in the opposite direction to the direction of flight (or of movement) of the aircraft AC.

Figure 3:
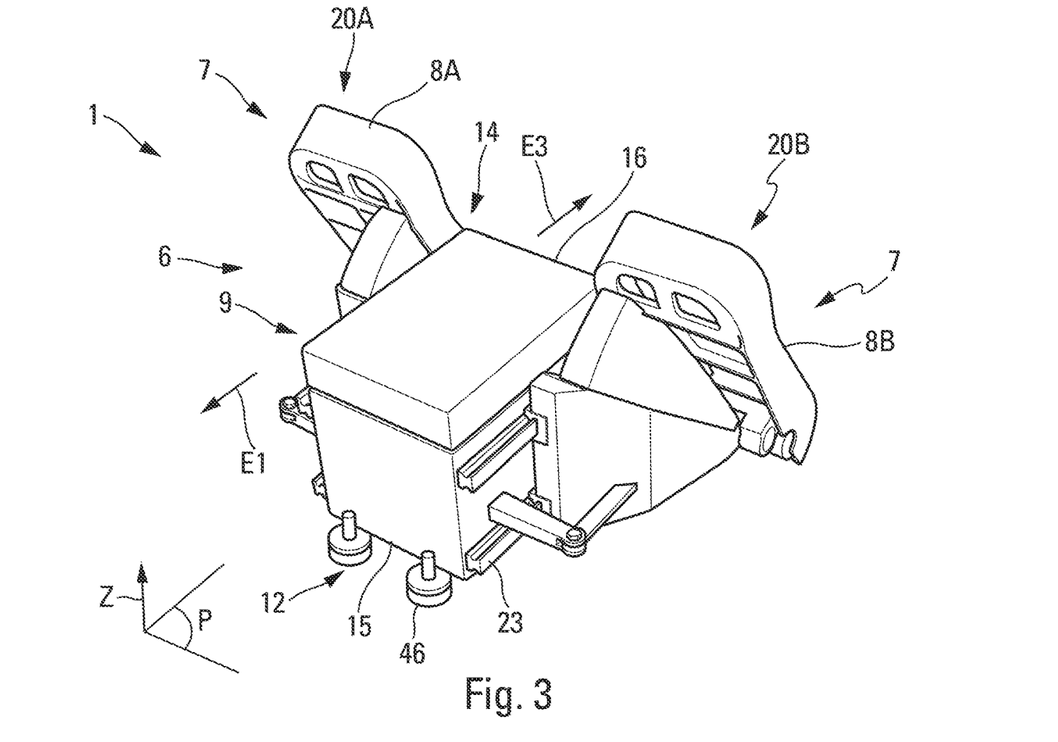
FIG. 3 is a perspective view of a rudder bar viewed from the front.
Figure 4:
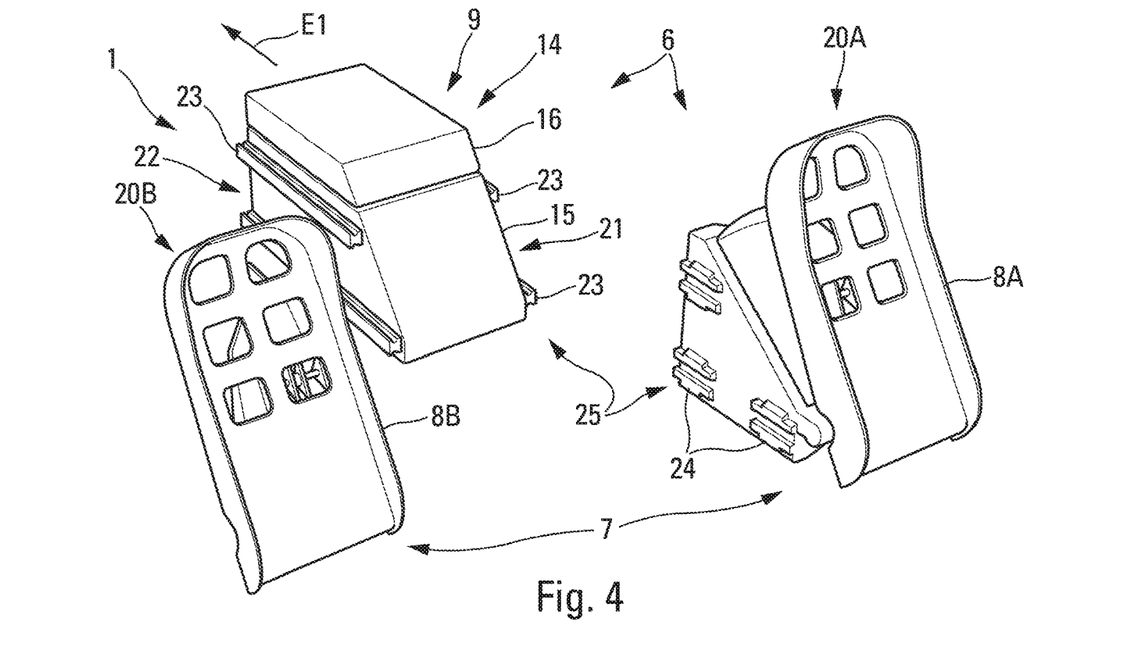
FIG. 4 is a perspective view, viewed from the rear, of a rudder bar for which the pedal modules are separated from a central module.

Furthermore, within the scope of the present description, the terms "lower", "upper", "low" and "high" are defined in a vertical direction Z that is orthogonal to a horizontal plane P (defined by a direction called longitudinal direction and by a direction called lateral direction) of the aircraft, said plane P being parallel to the floor of the cockpit 2, as shown in FIG. 3.

More specifically:
the longitudinal direction is defined along the longitudinal axis of the aircraft;
the vertical direction Z forms, with the longitudinal direction, a plane, called vertical plane, that is parallel to a vertical plane of symmetry of the aircraft; and
the lateral direction is orthogonal to said longitudinal and vertical directions, the lateral direction forming, with the longitudinal direction, the plane P that is parallel to the floor 11 (FIG. 2) of the cockpit 2.

Conventionally, the rudder bar 1 of the aircraft AC is a control component that allows a pilot to control the rudder 3 (FIG. 1) so as to act on the yaw axis of the aircraft during a flight, and also to provide braking for the aircraft AC when said aircraft is moving on the ground.

The rudder bar 1, which is intended for a conventional transport airplane, comprises an activation assembly 6, shown in FIGS. 2 and 3, which is capable of being activated by a pilot, for example, the senior pilot or a co-pilot of the aircraft. To this end, the rudder bar 1 comprises a pair 7 of pedals. This pair 7 comprises two pedals 8A and 8B intended to be activated by the two feet, respectively right and left, of the pilot.

For an aircraft piloted by two pilots, the rudder bar 1 comprises two activation assemblies 6, such as those shown in FIGS. 2 and 3, for example, which are conventionally configured so that the pedals intended for one of the pilots, the co-pilot, for example, are always in the same position as those intended for the other pilot, the senior pilot, for example.

According to an embodiment of the invention, said rudder bar 1 comprises a main module 9 provided at least with said pedals 8A and 8B and a set of functionalities that will be described hereafter. Furthermore, according to an embodiment of the invention, said main module 9 is one-piece, i.e. it is produced as a single block and it is unitary (while corresponding to a single object).

Within the scope of the present description, "set of functionalities" is understood to be all the functions inherent in a rudder bar.

Figure 8:
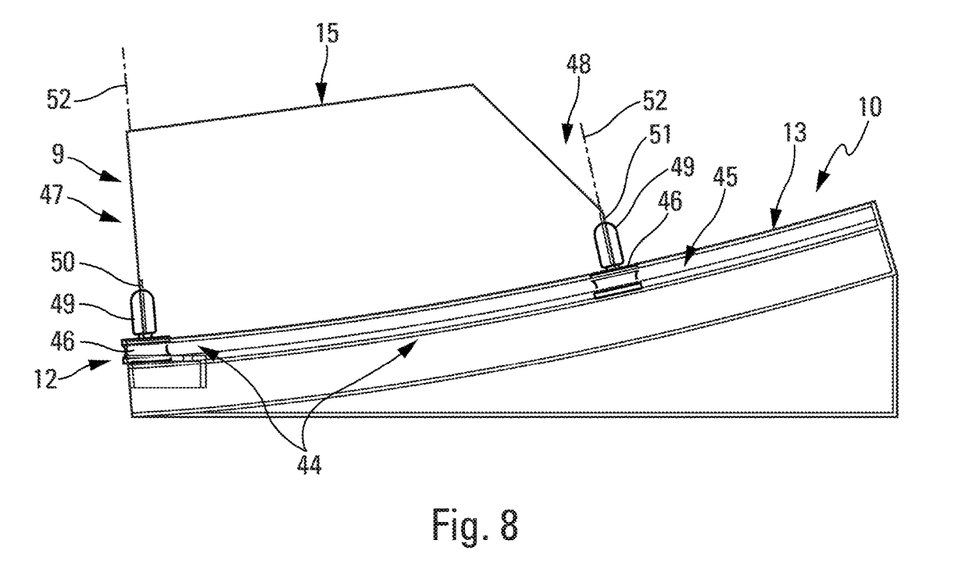
FIGS. 8 and 9 are lateral and perspective schematic views, respectively, of the support frame.
Figure 9:
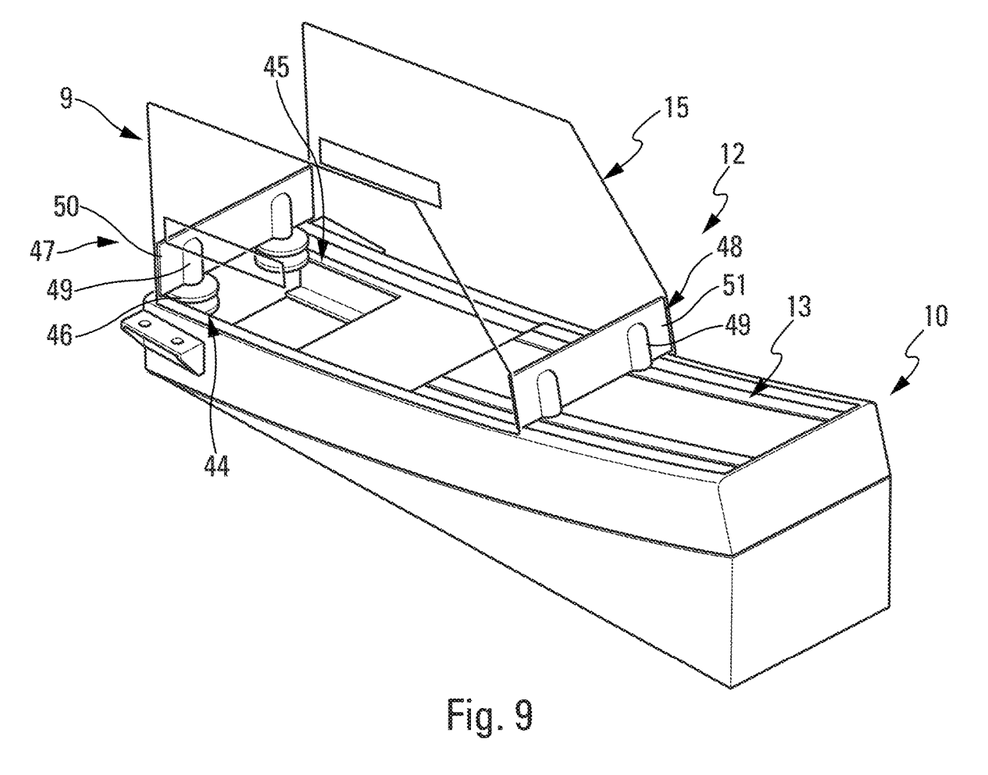

The rudder bar 1 further comprises, as shown in FIG. 2, at least one curved support (and guide) frame 10 intended to be integrated into the floor 11 of the aircraft, and the main module 9 is configured to be able to be moved and positioned on the curved support frame 10, as shown by a double arrow F, using a movement unit 12 (described hereafter with reference to FIGS. 8 and 9).

The main module 9 is adjusted in position, before flight, by the user. This adjustment can be performed electrically, as specified hereafter.

The movement unit 12 also allows a detachable connection to be completed for the main module 9 relative to the support frame 10. In a preferred embodiment, the support frame 10 is provided with a curved upper face 13 (as shown in FIG. 2), representing a curved concave shape, on which the main module 9 is moved.

Within the scope of the present description, the term "detachable" means that a part can be removed, withdrawn, but also put back in its place.

In a preferred embodiment, said main module 9 comprises, for integrating the set of functionalities, as shown in FIGS. 2 to 5, a central module 14 comprising a lower base module 15 and an upper electronic module 16.

The electronic module 16 is detachably mounted on the base module 15.

In a particular embodiment, the electronic module 16 is rigidly connected to the base module 15 via front centering elements and rear attachment elements (not shown).

Thus, by virtue of the integration of the main elements into a single main detachable module 9, the rudder bar 1 exhibits significant flexibility, in terms of its maintainability, particularly in the event of the failure of one or more of its internal components.

In order to extract the main module 9 from the support frame 10, the following operations can be implemented:
positioning the movable main module 9 in an extreme rear position;
extraction of the electronic module 16;
disconnection of front electrical connections;
disconnection of a hydraulic connection if two combined rudder bars (steering, braking) are present by acting on quick release and leak-proof connectors disposed in the rear part; and
extraction of the main module 9 through the rear, toward the pilot seat.

This extraction can be performed according to one of the following two options:
horizontal extraction of the movable main module 9, until the front rollers 46 are released (FIG. 3), with a rearward movement of the pilot seat (not shown) being required;
horizontal extraction of the movable main module 9, until the rear rollers are released, then upward release of the front rollers 46 (FIG. 3) through hatches (not shown) produced in guide rails, and extraction of the whole assembly through the top, with the rearward movement of the pilot seat not being required.

The reduced mass of the main module 9 allows a single operator, such as a maintenance agent, to perform the extraction.

In order to complete this extraction, the operator can sit on the pilot seat, with direct visibility of and access to the various elements on which they must work.

The whole of the main module 9 of the rudder bar 1, or its main components (or sub-assemblies) (the movable central module 14 or the pedal modules described hereafter), can be replaced with new movable modules.

The architecture of the rudder bar 1 simplifies the intervention (quick and simplified direct extraction), as explained hereafter, and also allows complete replacement of the main module 9, which can prove to be necessary when maintenance operations require a qualification beyond the level of qualification of a non-expert operator.

The relatively easy extraction of the main module 9 of the pedal bar 1 also allows the disassembly thereof to be contemplated in order to access the zone in which it is installed. More generally, and as specified hereafter, the rudder bar 1 allows a quick intervention, irrespective of the level of intervention (local or overall).

As explained below, all the elements subject to maintenance are consolidated on the same movable and detachable assembly, namely said main module 9. Furthermore, in the main module 9, all the most critical elements or components (level 1 criticality specified hereafter) with respect to maintenance are consolidated into the same highly accessible secure enclosure, while ensuring their very easy on-site replacement, as specified hereafter. For the remainder of the elements (criticality level 2 specified hereafter), a complete disassembly capability of the main module 9 is specified, allowing the disassembly to be performed simply and quickly, with a view to a standard exchange of the assembly of the main module or of the main sub-assemblies, such as the pedal modules, in particular.

Figure 5:
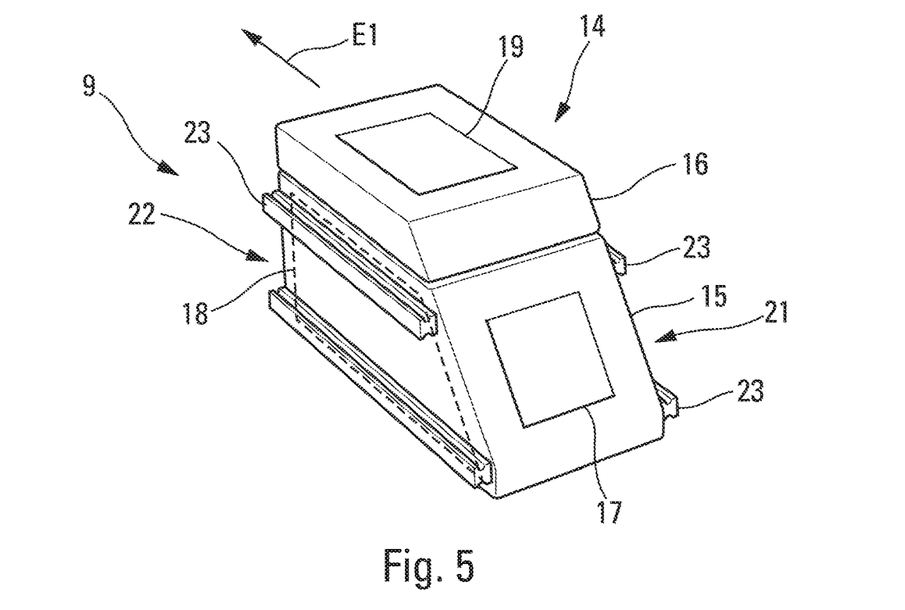
FIG. 5 is a perspective view of the central module of a rudder bar viewed from the rear.

In particular, in order to allow components to be extracted, the base module 15 is provided with access hatches 17 and 18, as shown in FIG. 5.

Furthermore, the electronic module 16 is also provided with at least one access hatch 19.

Other access hatches, such as the hatches 17 to 18 shown by way of an example in FIG. 5, can be provided on the central module 14.

Furthermore, in the event of the breakdown of the electronic module 16, said module also can be replaced by a new electronic module. The electronic module 16 can be attached, for example, at the rear face using two screws or nuts of the "racking" type and at the front face using a self-centering connector and centering and retention pins.

The electronic module 16 can be disassembled very quickly. This disassembly preferably involves the following steps:
  positioning the main module 9 in the extreme rear position for better proximity;
  disconnecting the following elements:
    on the rear face, a rear electrical interface with the movable central module 14 (highly accessible conventional attachment);
    on the front face, a connector block of the "racking" type and centering pins allowing blind connection and mechanical centering;
  rearward extraction of the electronic module 16 using a dedicated handle (not shown).

Furthermore, in a preferred embodiment, the main module 9 also comprises two pedal modules 20A and 20B, as is particularly shown in FIGS. 3 and 4. Each of these pedal modules 20A and 20B is provided with one of the pedals 8A and 8B.

Furthermore, each pedal module 20A, 20B can be detachably connected to the rest of the rudder bar 1 and particularly to the central module 14. A single pedal module 20A, 20B is thus obtained per pedal 8A, 8B, which can be easily disconnected from the rudder bar 1. This particularly allows the handling and the replacement of the one or more pedal modules 20A, 20B to be simplified and facilitated.

In a preferred embodiment, the central module 14 (and particularly its base module 15) is provided, on each of its lateral faces 21 and 22, with two guide rails 23 (each provided with a bearing track), as is particularly shown in FIGS. 3 and 4. These guide rails 23 are arranged parallel to each other on each of the lateral faces 21 and 22, one toward the bottom and the other toward the top of the central module 14.

These guide rails 23 are configured to engage with recirculating ball bearing packs 24. These packs 24 are fixed on the associated pedal module 20A, 20B and are configured to be able to move in the bearing tracks of the guide rails 23. These packs 24 form part of a connection system 25 of the pedal module 20A, 20B.

The base module 15 of the central module 14 is provided with access hatches 18 on the lateral faces 21 and 22 for connection to the pedal modules 20A and 20B.

The connection system 25 also allows easy and quick extraction of the pedal module 20A, 20B from said central module 9, on which it is detachably mounted.

This extraction operation can be necessary, particularly for replacing a defective pedal module 20A, 20B. This operation also can be implemented to access internal components of the central module 14, such as a component 26 (FIG. 6), via, for example, the access hatches provided on the lateral faces 21 and 22, such as the hatch 18 shown in FIG. 5.

The central module 14 comprises a plurality of components, generally represented by a reference sign, 26.

In a preferred embodiment, the central module 14 comprises at least, and preferably, a plurality of components 26, which are mounted, each time, by means of a dedicated (quick) locking/unlocking system 28.

In a particular embodiment, shown in FIGS. 7A to 7D, the locking/unlocking system 28 comprises:
  a housing 29 intended to receive the component 26, said housing 29 being provided with a single access opening 30 and a guide shaft 31 arranged at an end 32 opposite the access opening 30; and
  a closure device 33 mounted in an articulated manner and able to close the access opening 30 and to lock a component 26 installed in the housing.

Figure 7A:
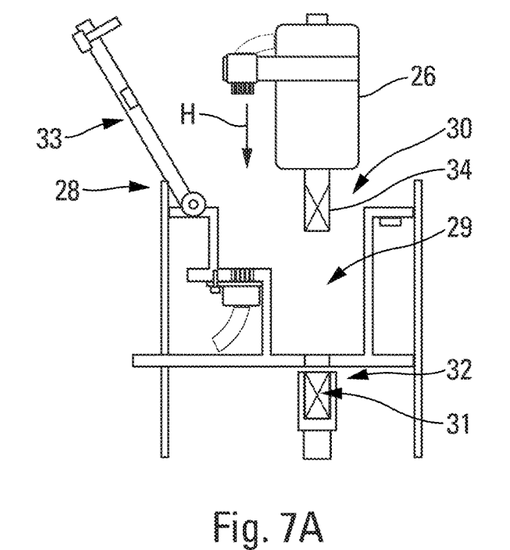
FIGS. 7A to 7D show various successive steps during the installation of a component of the rudder bar in a locking/unlocking system.
Figure 7B:
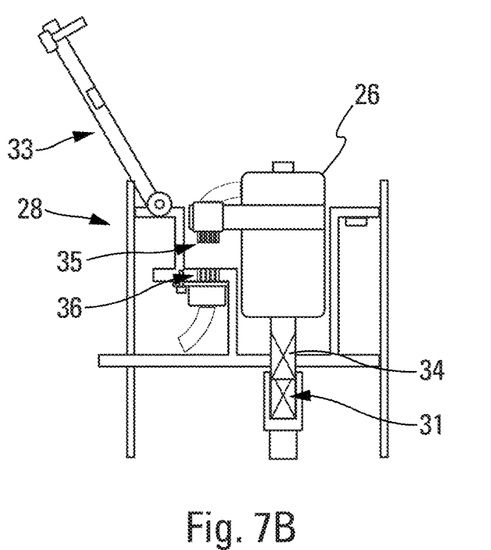
Figure 7C:
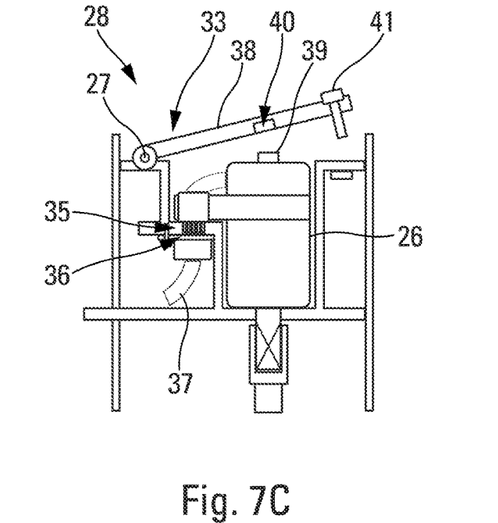
Figure 7D:
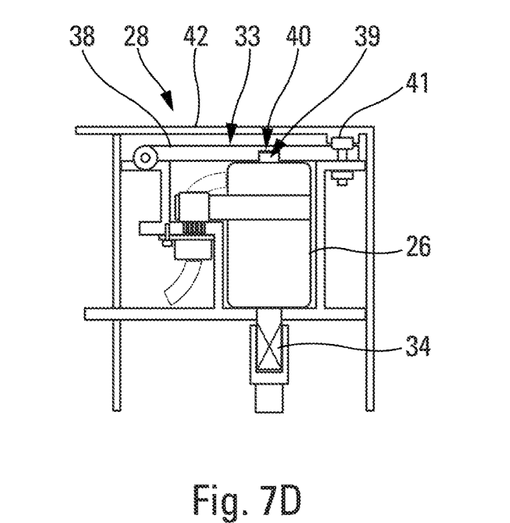

The insertion of a component 26 into this locking/unlocking system 28 comprises the following steps:
  bringing the component 26 toward the housing 29 and progressively introducing it, as shown by an arrow H in FIG. 7A;
  pre-guiding an end pin 34 of the component 26 into the guide shaft 31, allowing mechanical guidance to be performed, as shown in FIG. 7B;
  electrical insertion with an electrical connection between two engaging connection elements 35 and 36, which are respectively connected to the component 26 and to an electrical connection 37, as shown in FIG. 7C, and simultaneously tilting a pivoting door 38 of the closure device 28, which pivots about a hinge 27;

mechanical centering by inserting an end pin 39 of the component 26 into a cooperating housing 40 provided in the pivoting door 38, and locking the pivoting door 38, for example, using a screw 41, as shown in FIG. 7D.

The attachment of the closure device 33 can be secured by the arrangement of a closure plate 42 (comprising, for example, an additional housing intended to receive the head of the screw 41).

An extraction of a component 26 can be performed in the opposite direction to the insertion described above, from the situation of FIG. 7D to that of FIG. 7A.

The locking/unlocking system 28, as described above, thus allows simple and quick insertion and/or extraction of a component 26. The locking/unlocking system 28 is characterized by:

an attachment in the upper part, which is highly visible and highly accessible;

a single attachment screw 41 (minimum tooling and time);

a component 26 pre-guided in the guide shaft 31 on insertion;

mechanical centering on the functional mechanical interface providing blocking of the degrees of rotational freedom;

blind centering and electrical insertion; and locking of the only remaining degree of freedom, by pressing, then locking, via the pivoting door 38.

Figure 6:
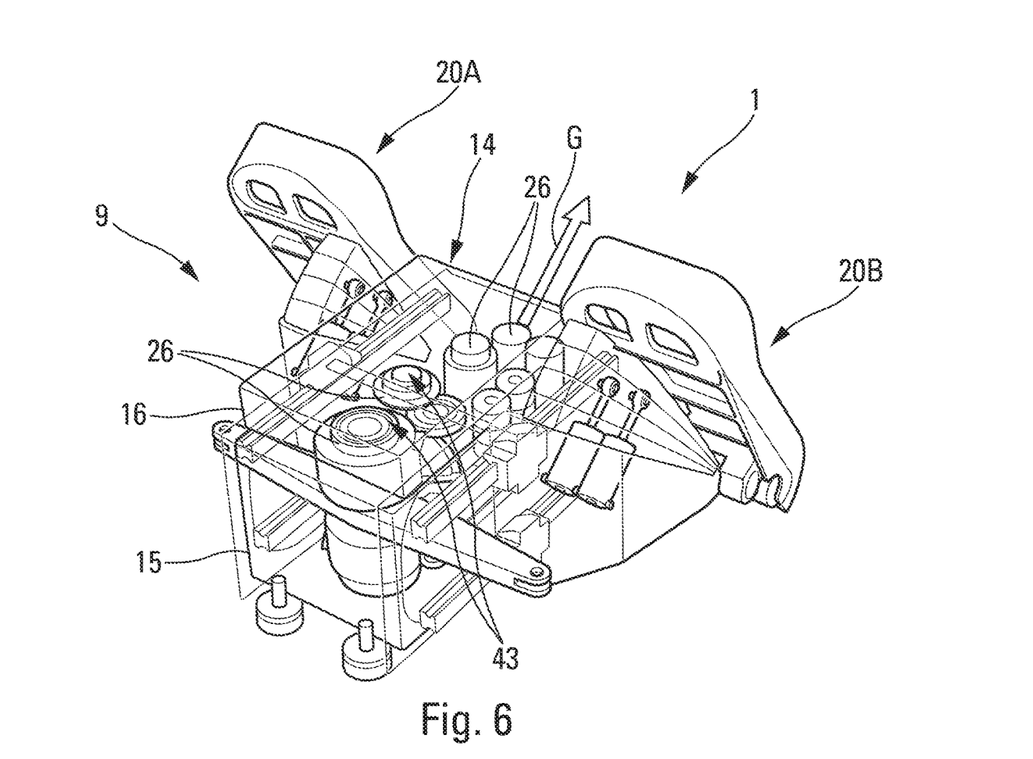
FIG. 6 is a figure similar to FIG. 3, with walls shown transparently, in order to show elements and components arranged inside the central module of the rudder bar.

In order to extract a component 26 from the central module 14, the following simply needs to be performed:

disassembly of the access hatch or hatches 17, 18, 19 (attached, for example, by screws and centering pins). The hatches also fulfill a structural function. Once in place, these hatches actually provide torsional rigidity for the whole of the central module 14;

direct and simple extraction of the considered component 26 of the central module 14, as is schematically shown by an arrow G in FIG. 6. If the attachment elements are easily accessible, a conventional screw attachment solution is used (equipment fitted on a base that is tightened with screws). Otherwise, the locking/unlocking system 28 described above is used.

Furthermore, in a preferred embodiment, the rudder bar 1 comprises a pedal feel and compensation unit, of the PFTU (Pedal Feel and Trim Unit) type, which is integrated into the central module 14 of the main module 9, as shown by a general reference sign, 43, in FIG. 6.

By way of an illustration, the pedal feel and compensation unit 43 particularly comprises:

a shaft clutch solenoid PA ("Trim");

a shaft clutch PA ("Trim");

shaft trim motors PA;

rudder bar shaft position sensors;

trim shaft position sensors;

a normal feel spring;

a feel spring PA (trim shaft);

a PFTU input lever; and an electronic management module.

Furthermore, in a particular embodiment, shown in FIGS. 8 and 9, the movement unit 12 allowing the main module 9 to move by the support frame 10 comprises, on the support frame 10, a guide system 44. This guide system 44 comprises a (single) set of rails, formed by two opposite and engaging lateral guide rails 45. These two guide rails 45 are arranged toward the upper face of the support frame 10, on opposite internal faces of lateral walls (along the axis X) of the support frame 10. Each of said guide rails 45 is in the form of an arc of a circle with a diameter that is preferably greater than two meters.

Furthermore, the movement unit 12 comprises rollers 46 that are rotationally mounted under the base module 15 of the main module 9. Preferably, the movement unit 12 comprises four rollers 46 substantially positioned in the four corners of the lower wall of the base module 15 and configured to be able to move in pairs in the two opposite lateral guide rails 45. The guide rollers 46 are integrated into a front face 47 and a rear face 48 of the base module 15. The rollers 46 are fixed in reinforced studs 49, which are rigidly connected to mechanically reinforced lower zones 50 and 51 of the faces 47 and 48. Furthermore, the rollers 46 are arranged so that their axes of rotation 52 (FIG. 8) are always oriented, irrespective of their position during a movement along the guide rails 45, along the radius of the circle corresponding to the described trajectory and more specifically the circle corresponding to the curvature of the guide rails 45.

The movement unit 12 also comprises an adjustment system (not shown) able to be controlled, preferably electrically, by an operator, particularly a pilot. This adjustment system is configured to allow the position of the main module 9 on the support frame 10 to be adjusted via a movement using the guide system 44.

For the rudder bar 1, as described above, the maintainability of all the components and equipment subject to maintenance (mainly a replacement in the event of a defect) is significantly improved.

To this end, the relevant elements are classified into two categories, respectively called level 1 and level 2. More specifically:

level 1 consolidates the components 26 and equipment for which maintenance must be performed as quickly as possible. This level 1 includes the components and electrical equipment (motors, sensors, solenoids, etc.) that are the most sensitive equipment, subject to a direct failure and directly connected to the aircraft systems, such as the management computers of the system; and level 2 consolidates, for its part, the other equipment and components, mainly the mechanical elements or equipment (functional or ancillary) and the hydraulic elements or equipment, which are considered to be less critical with respect to maintenance (greater reliability, not directly connected to the aircraft systems).

To this end, the following is provided:

consolidation of all the elements requiring maintenance (level 1 and level 2) into the one and the same movable element, namely said main module 9, and means for facilitating the disassembly of said main module 9;

consolidation of all the level 1 elements into the same secure and highly accessible enclosure, namely said central module 14 of the main module 9, in order to best preserve these elements, as well as to promote the disassembly capability per unit, on site.

Thus, two scenarios are possible:

according to a first scenario, in the event of a problem on a level 1 electrical component, it is replaced on site using a simplified and quick component extraction procedure, as is schematically shown by the arrow G in FIG. 6;

according to a second scenario, in the event of a problem on a level 2 component, the main module 9 is disassembled using a simplified and quick procedure for extracting said main module 9.

With all the equipment requiring quick maintenance being mounted on or in movable modules, this allows different types of intervention in the event of incidents on these elements and thus facilitates the maintainability. The fixed support frame 10 has, for its part, structural functions, for supporting and guiding movable elements.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A rudder bar for an aircraft, said rudder bar comprising:
at least first and second pedals and a set of functionalities;
at least one curved support frame configured to be integrated into a floor of the aircraft; and
a main module comprising at least said first and second pedals and said set of functionalities, said main module being one-piece and detachable, the main module extending along a longitudinal direction,
wherein the main module comprises, for integrating the set of functionalities, a central module comprising a lower base module and an upper electronic module, the upper electronic module detachably mounted on the lower base module, wherein the upper electronic module is mounted above the lower base module along a vertical axis orthogonal to a horizontal plane defined by the longitudinal direction and a lateral direction, and
wherein the upper electronic module comprises at least one first access hatch,
wherein said main module is configured to be able to be moved and positioned on the at least one curved support frame using a movement unit, and
wherein the movement unit comprises a guide system comprising first and second guide rails mounted on the at least one curved support frame and rollers rotationally mounted under the lower base module, the rollers engaging the first and second guide rails.

2. The rudder bar as claimed in claim 1, wherein, in a mounted position, the upper electronic module is rigidly connected to the lower base module via front centering elements and rear attachment elements.

3. The rudder bar as claimed in claim 2, wherein the lower base module comprises at least one second access hatch.

4. The rudder bar as claimed in claim 3, wherein the lower base module comprises the at least one second access hatch on at least one of the lateral faces of said lower base module.

5. The rudder bar as claimed in claim 1, wherein the main module further comprises first and second pedal modules, each of said first and second pedal modules comprising one of the first and second pedals, said first and second pedal modules detachably mounted on first and second sides of the lower base module, respectively, each of said first and second pedal modules mounted on an associated lateral face of the lower base module.

6. The rudder bar as claimed in claim 5, wherein the lower base module comprises, on each of the lateral faces, guide rails configured to engage with recirculating ball bearing packs, fixed on corresponding one of the first and second pedal modules.

7. The rudder bar as claimed in claim 1, further comprising a pedal feel and compensation unit, integrated into the central module of said main module.

8. The rudder bar as claimed in claim 7, wherein the pedal feel and compensation unit comprises at least one of the following elements: a clutch solenoid, a shaft clutch, a compensation motor, rudder bar shaft position sensors, compensation shaft position sensors, feel springs.

9. The rudder bar as claimed in claim 1, wherein the central module of said main module comprises at least one component mounted by a dedicated locking/unlocking system.

10. The rudder bar as claimed in claim 9, wherein the locking/unlocking system comprises:
a housing configured to receive the at least one component, said housing comprising a single access opening and a guide shaft arranged at an end opposite the access opening; and
a closure device mounted in an articulated manner and configured to at least partially close said access opening and to lock the at least one component installed in the housing.

11. An aircraft comprising a rudder bar according to claim 1.

* * * * *